Aug. 27, 1968   S. BERK   3,399,303
RADIOACTIVE METAL CORROSION EVALUATER AND METHODS THEREFOR
Filed March 4, 1965

INVENTOR.
SIGMUND BERK
BY: *Harry M. Saragovitz,*
*Edward J. Kelly, Herbert Berl &*
*J. Pubroff*
ATTORNEYS.

United States Patent Office
3,399,303
Patented Aug. 27, 1968

3,399,303
RADIOACTIVE METAL CORROSION EVALUATER AND METHODS THEREFOR
Sigmund Berk, Philadelphia, Pa., assignor to the United States of America as represented by the Secretary of the Army
Filed Mar. 4, 1965, Ser. No. 437,326
2 Claims. (Cl. 250—83.3)

ABSTRACT OF THE DISCLOSURE

Processes for quantitatively determining corrosion of metal specimens by placing them close to a suitable radioactive source and comparing the backscattered radiation emitted from the specimen with a previously calibrated standard.

The invention described herein may be manufactured and used by or for the Government for governmental purposes without the payment to me of any royalty thereon.

This invention relates to metal corrosion and more particularly concerns radioactive devices and methods for determining compositions and the type and extent of such corrosion. Present methods for evaluating the extent of corrosion are generally inadequate and unreliable. For example, the extent of corrosion is oftentimes determined by weight changes of the corroded pieces or by merely visually observing the corrosion. Similarly there are available methods utilizing the radioactive thickness gauge for measuring the amount of metal corroded on the inside of pipes. My methods and devices utilize radioactive materials and nuclear instrumentation to yield quantitative results in determining the extent and type of corrosion of metals and are highly sensitive and do not depend entirely on loss or gain of weight of the corroded metal for detection of corrosion.

Accordingly, it is an object of this invention to provide devices and methods therefor to accurately and rapidly determine the type of corrosion products and extent of corrosion of metals.

Another object of the invention is to provide methods for determining compositions of matter by radioactive means.

The exact nature of this invention as well as other objects and advantages thereof will be apparent from consideration of the following description and drawings wherein.

Figure 1:
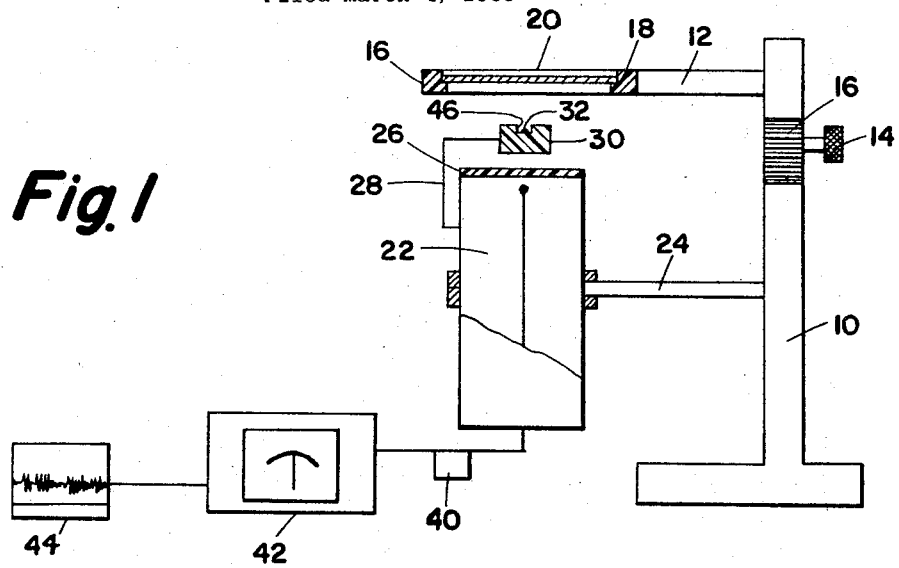
FIG. 1 illustrates an embodiment of my backscattering device.

Briefly, the present invention utilizes (A) beta particle and gamma ray backscattering and (B) radiation induced X-rays for measuring corrosion.

It is well known that when beta particles strike a surface material, the particles are absorbed or scattered by the atoms in the material. Some of the beta particles return in the general direction from which they came and this phenomenon is commonly called backscattering. The backscattering is not a reflection in the optical sense, since the reflection does not only occur in the surface layer but is a volume phenomenon. Also, backscattering increases with increasing thickness of the target until saturation. Saturation occurs generally at about ⅕ of the total range of the beta particles for that particular material. A further increase in thickness of the metal does not add to the reflected intensity. In backscattering, the beta particles must not only penetrate the entire thickness of material at saturation thickness but must also return through the same thickness to reach and actuate the radiation detector.

It has been known for some time that the backscattered radiation intensity is dependent on the nature of the scattering material, i.e. the radiation backscattered increases with increasing atomic number (Z). R. H. Muller has shown that backscattering of beta particles is a discontinuous function of atomic number and is linear with $\bar{Z}$ within each period of the periodic system and that backscattering could be calculated for any compound using an average atomic number, $\bar{Z}$. For example, $\bar{Z}$ for the compound $Fe_2O_3$ would be:

$$\bar{Z} = 2\frac{(\text{atomic weight Fe} \times \text{atomic No. of Fe}) + 3 (\text{at. wt. O} \times \text{at. No. O})}{\text{mol wt. of } Fe_2O_3}$$

or $$2\frac{(55.85 \times 26) + 3(16 \times 8)}{2(55.85) + 3(16)} = 16.393$$

The compilation in Table I below shows the effective atomic number ($\bar{Z}$) or percent backscattering that may be expected from a number of metals and their corrosion products. The calculation of the average atomic number or percent backscattering for known corrosion products and their agreement with experimental values can be used to determine the presence of unknown corrosion products in corrosion specimens. The calculated percent backscattering for rusted iron ($Fe_2O_3$) is about 30% less than that obtained with uncorroded iron. The procedure is to first measure the percent backscattering of the uncorroded specimen and then measure the percent backscattered from the corroded specimen. Two gauges could be used to automatically record the decrease in percent backscattering due to corrosion. The amount of $Fe_2O_3$ formed on a corroded iron specimen or the number of $FeK\alpha$-X-rays produced may be determined by measuring the quantity of backscattering or the number of $FeK\alpha$-X-rays produced with the device of FIG. 1. Specimens with known amounts of oxide could then be prepared and the amount of backscattering and $K\alpha$-X-rays measured. The calibrated specimens may now be used to determine the extent of corrosion quantitatively.

TABLE I.—CALCULATED EFFECTIVE ATOMIC NUMBERS ($\bar{Z}$) FOR A NUMBER OF CORROSION PRODUCTS FOR PREDICTING AND BACKSCATTERING

| Element or Compound | Z | $\bar{Z}$ (or percent backscattering) | Percent Decrease in backscattering |
|---|---|---|---|
| Fe | 26 | 23.387 | |
| $Fe_2O_3$ | | 16.393 | 29.9 |
| $Fe_2O_3 \cdot 3H_2O$ | | 14.076 | 39.8 |
| $Fe_3O_4$ | | 17.369 | 25.7 |
| $Fe_2O_3 \cdot H_2O$ | | 15.464 | 33.9 |
| $Fe(OH)_3$ | | 14.076 | 39.8 |
| Cu | 29 | 25.445 | |
| $Cu(OH)_2$ | | 21.538 | 15.4 |
| $CuCO_3$ | | 18.625 | 26.8 |
| CuO | | 24.777 | 2.6 |
| Ni | 28 | 24.759 | |
| NiO | | 23.716 | 4.2 |

Referring now to the drawings, my inventive device comprises a rigid metal stand 10 having an arm 12 extending normally therefrom and vertically adjustable therewith by means of a knurled knob 14 coacting with gearing 16 integral the stand. The arm 12 is adapted to receive a specimen or sample holder 18 by any conventional means which in turn receives the specimen 20 generally centrally therein. The specimen holder will conveniently be made of methylmethacrylate. A counter 22 of the Geiger-Müller, ionization chamber or methane proportional type is supported on another arm 24 of stand 10, the counter having a window 26, suitably of polyester films resting centrally atop thereof. Extending upwardly of counter 22 by means of a bracket 28 attached thereto by any well known means is a radioisotope shield and container 30 of methylmethacrylate film, for example, for containing the radiation source 32 of promethium-147, although hydrogen-3 (tritium), strontium-90, phosphorus-32, sulfur-35, thallium-204, carbon-14, etc. have been found to work satisfactorily. In addition, the device may be used for alpha-backscattering by using polonium-210 and americium-241. Similarly, for very thick corrosion products, gamma backscattering device utilizing gamma emitters such as iridium-192, americium-241, cesium-137 or thulium-170 have been found to work well. The radiation source may also be a pure beta particle emitter or soft gamma emitters such as cadmium-109 with a maximum energy of .087 mev. The choice of the radioisotope to be used depends on the thickness of the corrosion product to be measured and the half-life of the desired radioisotope. The greatest sensitivity is obtained with a radioisotope whose maximum beta particle energy is such that its range in the metal sample is just sufficient to penetrate the corrosion products and be backscattered into the detector-counter system comprising a preamplifier and discriminator 40, scaler or rate meter 42 and recorder 44.

Figure 2:
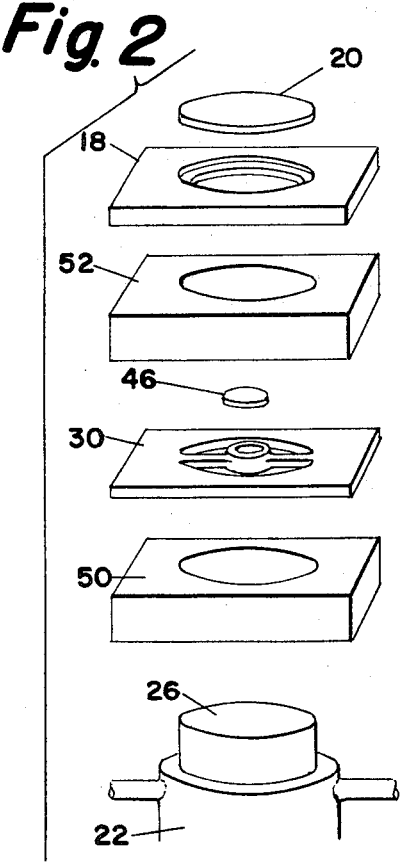
FIG. 2 is an exploded view of a typical methylmethacrylate plastic assembly made in accordance with my invention.

The methylmethacrylate shield 30 for containing the radioactive source 32 may be designated as shown in FIG. 1 or FIG. 2 such that the beta particles cannot enter the detector directly below the radioactive source due to the thickness of the shield. The radioactive source strength may range from a fraction of a microcurie to hundreds of millicuries or curies depending on the sensitivity desired and the nuclear instrumentation used for detection. A 0.5 mil methylmethacrylate disc 46 (FIG. 2) may be used to cover the radiation source to prevent any contamination thereof. The thickness of the polyester film window may also be used to control the range of the beta-particles since it is known to act as an absorber. The counter shown may be a Geiger-Müller tube with 1.9 mg./cm.$^2$ mica windows connected to a preamplifier 40 and to a scaler 42. In addition a methane gas proportional counter may be used in lieu of the Geiger-Müller type. A windowless proportional counter may similarly be used to detect very low energy backscattering radiation. For higher levels of radiation, an ionization chamber has been found to work admirably well. Proportional gas flow counters have good stability, long life, and short recovery time. Geiger-Müller counters generally have poor stability, short-life with intense radiation, and long recovery time. Scintillation counters are also useful especially for gamma emitters.

Spacers 50 and 52 of varying thicknesses may be used to obtain optimum distances between the counter and radioactive source and the radio-active source and specimen respectively.

I have discovered that the optimum distance between specimen 20 and the counter window 26 is 0.5 to 0.6 inch. The distance of the radioactive source 32 to the counter window may conveniently be of the order of about 0.25 inch. Further, the geometry or arrangement of the source 32, sample 20 and counter 22 may affect the amount of backscattered radiation obtained.

In order to illustrate my invention, the following description of a method is given. Copper disks 1″ in diameter, uncorroded and corroded, are placed in the specimen holder and the backscattered radiation measured for a total of at least 100,000 counts. The principle of my invention is that the amount of backscattering is a function of the thickness and atomic number of the target material and corrosion products. It has been confirmed by experimental data that the uncorroded metal will have a higher backscattering value than the corroded metal since the effective atomic number of the corrosion product is less than the effective atomic number ($\bar{Z}$) of the base metal. The table below shows in counts per minute the amount of backscattering obtained with corroded and uncorroded copper, steel, and niobium metal specimens.

TABLE II.—EFFECT OF SURFACE CORROSION ON COPPER DISKS (1″ IN DIAMETER) ON BACKSCATTERING OF Pm-147 BETA PARTICLES

| Surface Treatment | Net c./m.×10$^{-3}$ | Percent Decrease in Backscattering |
|---|---|---|
| Uncorroded | 33.6 | |
| Oxide by heating | 31.7 | 5.7 |
| Oxide by heating in water | 33.3 | 0.9 |
| Sulfide | 33.0 | 1.8 |
| Oxidation product (from nitric acid) | 24.7 | 26.5 |
| Chloride (from hydrochloric acid) | 29.0 | 13.7 |
| Salt spray (light corrosion) | 32.9 | 2.1 |
| Salt spray (heavy corrosion) | 25.9 | 22.9 |

EFFECT OF SURFACE CORROSION ON STEEL DISCS (11/16″ IN DIAMETER) ON BACKSCATTERING OF Pm-147 BETA PARTICLES

| | | |
|---|---|---|
| Uncorroded | 17.0 | |
| Oxide by heating in flame | 16.2 | 4.7 |
| Salt spray corrosion | 13.5 | 20.6 |

EFFECT OF OXIDATION OF NIOBIUM FOIL ON BACKSCATTERING OF Pm-147 BETA PARTICLES

| | | |
|---|---|---|
| Unoxidized | 23.9 | |
| Oxide coating (thin) | 23.0 | 3.7 |
| Oxide coating (thicker) | 21.9 | 8.4 |

My backscattering device may also be used to obtain data on the effect of the thickness of oxide films of copper, steel, and niobium, by backscattering radiation. Table III shows the amount of backscattering obtained when two inch square nickel specimens were oxidized by heating at 1000, 1500, and 1900° F. for 10 minutes.

TABLE III.—EFFECT OF OXIDATION BY HEATING NICKEL PANELS FOR 10 MINUTES AT VARIOUS TEMPERATURES ON BACKSCATTERING OF Pm-147 BETA PARTICLES

| Temperature, °F. | Net Counts/ min.×10$^{-3}$ | Percent Change from Control |
|---|---|---|
| Control (not heated) | 93.7 | |
| 1,000 | 92.2 | −1.6 |
| 1,500 | 88.1 | −6.0 |
| 1,900 | 80.2 | −14.3 |

Table IV shows the effect of oxidation time of the aforementioned nickel squares by heating at 1000° F. on the amount of backscattering. The count rate decreased from 0.5 percent for the specimen heated for 1 minute to 10.3 percent for the specimen heated 20 minutes.

TABLE IV.—EFFECT OF TIME OF OXIDATION, BY HEATING NICKEL PANELS AT 1,000° F. (538° C.) FOR VARIOUS TIMES ON BACKSCATTERING OF Pm-147 BETA PARTICLES

| Minutes Heated | Net Counts/ min.×10$^{-3}$ | Percent Change from Control |
|---|---|---|
| 0 | 71.6 | |
| 1 | 71.2 | −0.5 |
| 2 | 69.6 | −2.8 |
| 5 | 67.5 | −5.8 |
| 10 | 65.9 | −8.0 |
| 20 | 64.2 | −10.3 |

In accordance with Table III above, nickel specimens, for example, may be heated for a specified time at different temperatures. The amount of radiation backscattering obtained will thus be determinative of the temperature at which the specimens were held at that specific temperature. Conversely, and as shown in Table IV, if specimens are held constant at a certain specific temperature the amount of backscattering will indicate how long the specimen was held at that specified temperature.

Niobium disks three mils thick and 1⅞ inch in diameter were anodized at various voltages in a bath of one gram of ammonium carbonate per liter of water. Table V shows the amount of backscattering obtained. The backscattering count rate was decreased when the calculated oxide film thickness of the metal increased.

TABLE V.—EFFECT OF NIOBIUM OXIDE FILM THICKNESS ON BACKSCATTERING OF Pm-147 BETA PARTICLES

| Volts | Approx. Thickness of Oxide Film in A. (calculated) | Color | Net Counts/min. ×10⁻³ | Percent Change from Control |
|---|---|---|---|---|
| 0 | | Silver | 24.9 | |
| 45 | 700 | Yellow | 18.5 | −25.9 |
| 97 | 1,600 | Pink | 17.2 | −30.9 |
| 500 | 8,200 | Gray | 16.0 | −35.9 |

In order to determine the effectiveness of my beta-particle backscattering method for measuring the thickness of oxide or corrosion films, tantalum disks, ¾ inch in diameter, coated with varying thicknesses of aluminum were obtained. Since oxygen had an atomic number of 8 and aluminum 13, while the backing material, tantalum, has a Z value of 73, the results obtained with these specimens on the amount of backscattering would be comparable to those expected from oxide or anodic coatings of varying thicknesses.

Figure 3:
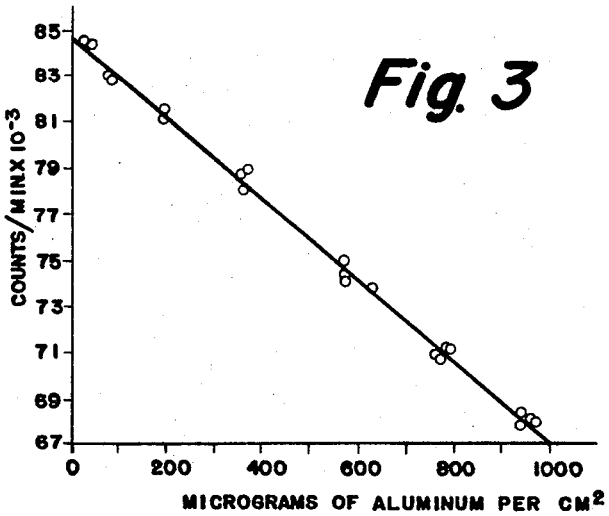
FIG. 3 is a graphical representation of typical backscattering counts versus weight of specimen sample.

FIG. 3 shows the decrease in the amount of backscattering obtained with increasing weight of aluminum per unit area on the tantalum targets. The thicknesses of the aluminum coatings ranged from $5.2 \times 10^{-5}$ mm. to $3.8 \times 10^{-2}$ mm. These thicknesses correspond to 14 to 1,179 micrograms of aluminum per cm.$^2$.

Another method for measuring corrosion quantitatively or determining composition of matter utilizes alpha-particles, protons, beta-particles or gamma-ray radiation induced X-rays in the metal specimen. When radiation of the above mentioned types interact with the orbital electrons of a metal target material such as copper or iron, for example, X-rays with characteristic energies of the target material are produced. The method, therefore, can measure the type of corrosion product by the characteristic energies produced and the amount of corrosion products by the intensity of the X-ray induced radiation. The principle of my method resides in the fact that on an uncorroded metal surface such as copper, a maximum number of CuKα-X-rays will be induced in a certain volume of the metal specimen by the beta-particle radiation. However, if the same copper surface is then corroded, the volume increases due to the migration of oxygen atoms into the copper. The same volume would then have fewer copper atoms than before resulting in fewer CuK-X-rays produced per unit volume. Similarly, the oxide or corrosion product formed absorbs some of the beta radiation resulting in a lower CuKα-X-ray production. A number of beta-particle radiation sources may be used such as strontium-90, hydrogen-3, krypton-85, thulium-170, phosphorus-32, promethium-147, sulfur-35, thallium-204, and carbon 14. In addition α-emitters such as polonium-210 and americium-241 and gamma emitters such as iodine-125, iron-55, americium-241, cesium-137, and iridium-192 have been found to work satisfactorily. Protons may also be used to produce Kα-X-rays in the specimen measured. A polyester film window 46 over the radioactive source may be used where the energy of the beta radiation of the source is sufficient to pass therethrough. The counter 22 will, in this instance, be either of the proportional or scintillation type, and not a Geiger tube, and will have a 0.2 mm. to 25 mm. thick sodium iodide (thallium activated) crystal coupled to a photomultiplier tube, all well known in the art. A pulse height analyzer operating in conjunction with a scintillation or proportional type counter, also well known in the art was operated at about 956 volts with a 5 volt window and a time constant of 50 seconds. A 1000 channel analyzer, again well known in the art, was used. Suitable single or multichannel (256) analyzers with high sensitivity to low energy X-rays of one to 100 kev. are also suitable. The multichannel pulse height analyzer is connected to a scaler, rate meter or recorder as shown. The uncorroded copper specimen 20, for example, is placed in the sample holder and the multichannel analyzer set to scan between 0 and 1000 channels for the Kα line for the copper. The Kα line for copper was found with a particular spectrometer to be 7.769 kev. (actual value is 8.047 kev.). The radiation reading for the uncorroded copper was 35,000 counts per minute. The amount of X-radiation increases with increasing target thickness up to a maximum, after which a decrease occurs due to X-ray absorption by the target material. The salt spray corroded copper specimens were then placed in the sample holder and the process repeated. The Kα radiation level for the corroded copper specimen was 30,000 counts per minute. The corroded copper produced 14 percent less counts for CuKα-X-rays than the uncorroded copper specimen. When brass specimens were salt spray corroded, a 12 percent decrease in count rate for the CuKα-X-rays was obtained as compared to the uncorroded control brass specimens. With steel, the corroded disks produced 6 percent fewer FeKα-X-rays than the uncorroded steel metal.

Very low energy Kα-X-rays may be determined by using a 0.2 mil thick beryllium window and an atmosphere of hydrogen or helium surrounding the counter, specimen and source, the counter having a 1 mg./cm.$^2$ polyester film window. For elements having an atomic number below 12, a windowless proportional flow counter may be effectively used.

My method measures the decrease in radiation intensity with increasing oxygen, sulfur, carbonate, etc. content of the corrosion products present when X-rays are executed in the backing metal by radiation sources. The radiation attenuation is attributed to a coating of increasing thickness of the corrosion product. Since every element has a characteristic Kα-X-ray and a characteristic Lα-X-ray with known energy, my method of radiation induced Kα-X-rays may be used to determine accurately the composition of any material or surface.

I claim:
1. A process for determining the temperature at which metal specimens are heated for a specified time comprising
   placing the metal specimen in a non-metallic low atomic number holder,
   placing promenthium-147 in critical proximity to said specimen, detecting radiation backscattered from said metal specimen, measuring the amount of backscattered radiation, indicating from said backscattered radiation the temperature at which the specimen was held, and
   comparing the amount of said measured backscattered radiation with the amount of backscattered radiation emitted from a previously calibrated standard.
2. A process for determining the amount of time at which metal specimens are heated at a specified temperature comprising
   placing the metal specimen in a non-metallic low atomic number holder,
   placing promethium-147 in critical proximity to said specimen, detecting radiation backscattered from said metal specimen, measuring the amount of backscattered radiation, indicating the amount of time at which said specimen was heated at a specific temperature from said measured backscattered radiation, and
   comparing the amount of said measured backscattered radiation with the amount of backscattered radiation emitted from a previously calibrated standard.

References Cited

UNITED STATES PATENTS

| | | | |
|---|---|---|---|
| 2,939,012 | 5/1960 | Scherbatskoy | 250—83.3 X |
| 2,967,934 | 1/1961 | Martinelli | 250—83.3 X |
| 2,997,586 | 8/1961 | Scherbatskoy | 250—83.3 X |
| 3,132,248 | 5/1964 | Eggebraaten et al. | 250—83.3 X |
| 3,146,347 | 8/1964 | Ziegler | 250—83.3 X |

ARCHIE R. BORCHELT, *Primary Examiner.*